United States Patent
Schwab

(10) Patent No.: US 10,308,888 B1
(45) Date of Patent: Jun. 4, 2019

(54) QUATERNARY AMMONIUM FUEL ADDITIVES

(71) Applicant: Afton Chemical Corporation, Richmond, VA (US)

(72) Inventor: Scott D. Schwab, Richmond, VA (US)

(73) Assignee: AFTON CHEMICAL CORPORATION, Richmond, VA (US)

( * ) Notice: Subject to any disclaimer, the term of this patent is extended or adjusted under 35 U.S.C. 154(b) by 0 days.

(21) Appl. No.: 16/009,403

(22) Filed: Jun. 15, 2018

(51) Int. Cl.
*C10L 1/22* (2006.01)
*C10L 10/04* (2006.01)
*C10L 1/222* (2006.01)
*C10L 1/232* (2006.01)
*F02M 65/00* (2006.01)
*C10L 10/06* (2006.01)

(52) U.S. Cl.
CPC .............. *C10L 10/04* (2013.01); *C10L 1/2222* (2013.01); *C10L 1/232* (2013.01); *C10L 10/06* (2013.01); *F02M 65/008* (2013.01); *C10L 2200/0259* (2013.01)

(58) Field of Classification Search
CPC .................................................. C10L 1/2222
USPC ......................................................... 44/422
See application file for complete search history.

(56) References Cited

U.S. PATENT DOCUMENTS

| | | | | |
|---|---|---|---|---|
| 4,171,959 A * | 10/1979 | Vartanian | ............. | C10L 1/2437 44/333 |
| 4,248,719 A * | 2/1981 | Chafetz | ............. | C07D 207/412 508/293 |
| 5,254,138 A * | 10/1993 | Kurek | ....................... | C08F 8/44 44/338 |
| 8,153,570 B2 * | 4/2012 | Barton | ................... | C10L 1/2383 508/547 |
| 8,529,643 B2 | 9/2013 | Galante-Fox et al. | | |
| 8,765,650 B2 * | 7/2014 | Delbridge | ............ | C10M 133/06 508/547 |
| 8,894,726 B2 | 11/2014 | Fang et al. | | |
| 9,951,285 B2 * | 4/2018 | Roeger-Goepfert | .... | C10L 1/221 |
| 2012/0138004 A1 * | 6/2012 | Stevenson | ............. | C10L 1/2222 123/1 A |
| 2013/0031828 A1 * | 2/2013 | Reid | ....................... | C10L 10/04 44/386 |
| 2013/0104826 A1 * | 5/2013 | Burgess | ................ | C10L 1/2383 123/1 A |
| 2014/0157656 A1 * | 6/2014 | Reid | ....................... | C10L 1/146 44/353 |
| 2014/0174390 A1 * | 6/2014 | Reid | ....................... | C10L 1/146 123/1 A |
| 2015/0252278 A1 * | 9/2015 | Bush | ..................... | C07C 235/10 44/332 |
| 2016/0130514 A1 * | 5/2016 | Hansch | ................... | C10L 1/222 508/547 |
| 2016/0152910 A1 * | 6/2016 | Reid | ....................... | C10L 10/18 123/1 A |
| 2016/0152912 A1 * | 6/2016 | Mulqueen | ............. | C10L 1/2222 123/1 A |
| 2017/0096610 A1 * | 4/2017 | Bush | ..................... | C10L 1/2383 |
| 2017/0096611 A1 * | 4/2017 | Stevenson | ............ | C10M 133/56 |
| 2017/0101594 A1 * | 4/2017 | Stevenson | ............... | C10L 10/04 |
| 2017/0107438 A1 * | 4/2017 | Greenfield | ........... | C10M 133/56 |
| 2017/0114296 A1 * | 4/2017 | Arters | .................. | C10M 133/56 |
| 2017/0114297 A1 * | 4/2017 | Sampler | ............... | C10M 133/46 |
| 2017/0121628 A1 * | 5/2017 | Moreton | ............. | C10M 133/56 |
| 2017/0166826 A1 * | 6/2017 | Culley | ................. | C10M 133/08 |
| 2017/0218291 A1 * | 8/2017 | Reid | ....................... | C07C 215/40 |
| 2018/0066202 A1 * | 3/2018 | Gahagan | ............. | C10M 141/08 |
| 2018/0223203 A1 * | 8/2018 | Cook | ................... | C07D 233/58 |

FOREIGN PATENT DOCUMENTS

EP   2531580 B1   11/2017

OTHER PUBLICATIONS

Shanahan, Charles S. et al. "A General Method for Fouling Injectors in Gasoline Direct Injection Vehicles and the Effects fo Deposits on Vehicle Performance," SAE Int. J. Fuels Lubr. 10(3):2017, doi:10.4271/2017-01-2298.

* cited by examiner

*Primary Examiner* — Ellen M McAvoy
(74) *Attorney, Agent, or Firm* — Honigman LLP

(57) ABSTRACT

The present disclosure provides fuel additives including a quaternary ammonium salt formed by reacting an alkyl carboxylate with a compound formed from a hydrocarbyl substituted acylating agent reacted with a select amine. Also provided herein are fuel compositions including the novel fuel additives and methods of combusting a fuel including the fuel additives herein. The unique quaternary ammonium salts herein are advantageous because they can be made through a simple alkylation process and provide improved detergency at low treat rates by making available a relatively less sterically hindered quaternary nitrogen for detergency activity in the fuel.

21 Claims, No Drawings

QUATERNARY AMMONIUM FUEL ADDITIVES

TECHNICAL FIELD

This disclosure is directed to fuel additive compositions that include hydrocarbyl soluble quaternary ammonium salts and to methods for using the salts in a fuel composition as fuel detergents.

BACKGROUND

Fuel compositions for vehicles are continually being improved to enhance various properties of the fuels in order to accommodate their use in newer, more advanced engines. Often, improvements in fuel compositions center around improved fuel additives and other components used in the fuel. For example, friction modifiers may be added to fuel to reduce friction and wear in the fuel delivery systems of an engine. Other additives may be included to reduce the corrosion potential of the fuel or to improve the conductivity properties. Still other additives may be blended with the fuel to improve fuel economy. Engine and fuel delivery system deposits represent another concern with modern combustion engines, and therefore other fuel additives often include various deposit control additives to control and/or mitigate engine deposit problems. Thus, fuel compositions typically include a complex mixture of additives.

However, there remain challenges when attempting to balance such a complex assortment of additives. For example, some of the conventional fuel additives may be beneficial for one characteristic, but at the same time be detrimental to another characteristic of the fuel. Other fuel additives often require an unreasonably high treat rate to achieve their desired effect, which tends to place undesirable limits on the available amounts of other additives in the fuel composition.

Quaternary ammonium compounds, such as alkoxylated salts, have recently been developed as detergents for fuels. The quaternary ammonium compounds, in some instances, are obtained from an acylating agent reacted with a polyamine, which is then alkylated or quaternized by a quaternizing agent. While providing improved detergency compared to prior detergents, these quaternary ammonium compounds and their methods of alkylation, however, still have several shortcomings. For example, in some instances, ethylene oxides and propylene oxides are used to make such detergents. Such oxides, however, are often undesired due to their handling difficulties. Quaternary ammonium compounds may also be formed through alkylation using dialkyl carbonates. However, the carbonate anion may be susceptible to precipitation and drop out of certain types of fuels or fuel additive packages. Other quaternary ammonium salts require halogenated carboxylic acids as quaternary agents. These salts may include residual halogens that may be less preferred in some applications. In yet other instances, removing undesirable ash generating components from the quaternizing manufacturing process is complicated.

While offering an improvement in detergency, prior quaternary ammonium compounds still have limitations in that relatively higher treat rates may be required to achieve adequate detergency effect in some applications. Often the pendant quaternary nitrogen in the quaternary ammonium salt is a derived from a diamine, such as dimethylamino propylamine, a common tertiary diamine obtained from the Michael reaction between dimethylamine and acrylonitrile through a subsequent hydrogenation. This diamine is a commonly available and convenient amine to form a quaternary ammonium salt. However, when using such tertiary amine source in a quaternizing reaction, it is often hindered in its availability for alkylation and/or activity as a detergent. As a result, quaternary ammonium salts obtained from such tertiary amines may not be sufficiently effective for improving injector performance at relatively low treat rates.

SUMMARY

In one aspect, a fuel additive is provided that includes a quaternary ammonium salt formed by the reaction of an alkyl carboxylate with an amide or imide compound obtained by reacting a hydrocarbyl substituted acylating agent and an amine, wherein the amine has the structure of Formula I

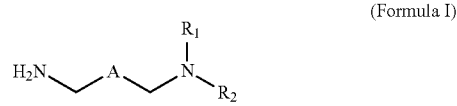

(Formula I)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, —C(O)NR'; $R_1$ and $R_2$ are independently alkyl groups containing 1 to 8 carbon atoms; and R' is independently a hydrogen or a group selected from $C_{1-6}$ aliphatic, phenyl, or alkylphenyl.

The fuel additive of the preceding paragraph may be combined with one or more optional features either individually or in any combination thereof. These optional features include: wherein the alkyl carboxylate is alkyl oxalate, alkyl salicylate, or a combination thereof; and/or wherein the alkyl group in the alkyl carboxylate is $C_1$ to $C_6$ alkyl; and/or wherein A is —$(CH_2)_r$—[X—$(CH_2)_{r'}]_p$— with each of r, r', and p independently being 1, 2, 3, or 4 and X being oxygen or NR" with R" being hydrogen or a hydrocarbyl group; and/or wherein X is oxygen; and/or wherein the amine is selected from 3-(2-(dimethylamino)ethoxy) propylamine, N,N-dimethyl dipropylene triamine, and mixtures thereof; and/or wherein the hydrocarbyl substituted acylating agent is selected from a hydrocarbyl substituted dicarboxylic acid or anhydride derivative thereof, a fatty acid, or mixtures thereof; and/or wherein the hydrocarbyl substituent has a number average molecular weight of about 200 to about 2500 as measured by GPC using polystyrene as a calibration reference.

In another aspect, the present disclosure provides a fuel composition comprising a major amount of a fuel and a minor amount of, in one aspect, a quaternary ammonium salt formed by the reaction of an alkyl carboxylate with an amide or imide compound obtained by reacting a hydrocarbyl substituted acylating agent and an amine of Formula I above. In another aspect, the fuel composition includes the formed quaternary ammonium salt of the structure of Formula II

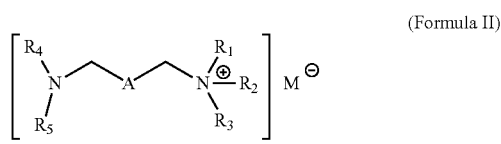

(Formula II)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, or —C(O)NR'; $R_1$, $R_2$, and $R_3$ are independently alkyl groups containing 1 to 8 carbon atoms; and R' is independently a hydrogen or a group selected from $C_{1-6}$ aliphatic, phenyl, or alkylphenyl; and $R_4$ and $R_5$ are independently a hydrogen, an acyl group, or a hydrocarbyl substituted acyl group, wherein if one of $R_4$ or $R_5$ is hydrogen, then the other of $R_4$ and $R_5$ is the acyl group or the hydrocarbyl substituted acyl group, and if both $R_4$ and $R_5$ include carbonyl moieties, then one of $R_4$ and $R_5$ includes the acyl group and the other of $R_4$ and $R_5$ includes the hydrocarbyl substituted acyl group, and $R_4$ and $R_5$ together with the N atom to which they are attached, combine to form a ring moiety; and $M^-$ is a carboxylate.

The fuel additive of the preceding paragraph may be combined with one or more optional features either individually or in any combination thereof. These optional features include: wherein the fuel composition includes about 1 to about 100 ppm of the quaternary ammonium salt; and/or wherein the carboxylate is oxalate, salicylate, or combinations thereof; and/or wherein A is —$(CH_2)_r$—[X—$(CH_2)_{r'}]_p$— with each of r, r', and p independently being 1, 2, 3, or 4 and X being oxygen or NR" with R" being hydrogen or a hydrocarbyl group; and/or wherein X is oxygen; and/or wherein A includes a moiety derived from 3-(2-(dimethylamino)ethoxy) propylamine, N,N-dimethyldipropylenetriamine, or mixtures thereof; and/or wherein $R_4$ and $R_5$, together with the nitrogen atom to which they are attached, combine to form a hydrocarbyl substituted succinimide; and/or wherein the hydrocarbyl substituent has a number average molecular weight of about 200 to about 2500 as measured by GPC using polystyrene as a calibration reference; and/or wherein the hydrocarbyl substituent of $R_4$ or $R_5$ has a number average molecular weight of about 200 to about 2500 as measured by GPC using polystyrene as a calibration reference.

In yet a further aspect, the present disclosure provides a method of operating a fuel injected engine to provide improved engine performance, such as but not limited to, reducing injector deposits in an internal combustion engine or fuel system for an internal combustion engine, cleaning-up fouled injectors, or un-sticking injectors. The methods herein include combusting in the engine a fuel composition including a major amount of fuel and about 1 to about 100 ppm of a quaternary ammonium salt formed by the reaction of an alkyl carboxylate with an amide or imide compound obtained by reacting a hydrocarbyl substituted acylating agent and an amine, wherein the amine has the structure

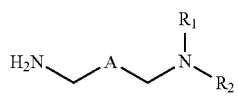

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, or —C(O)NR'; $R_1$ and $R_2$ are independently alkyl groups containing 1 to 8 carbon atoms; and R' is independently a hydrogen or a group selected from $C_{1-6}$ aliphatic, phenyl, or alkylphenyl. The present disclosure also provides for the use of the above described quaternary ammonium salt for providing improved engine performance, such as but not limited to, reducing injector deposits in an internal combustion engine or fuel system for an internal combustion engine, cleaning-up fouled injectors, or un-sticking injectors.

The methods or use described in the preceding paragraph may be combined with one or more optional features either individually or in any combination thereof. These optional features include: wherein the improved engine performance is an average flow loss of about 45 percent or less when measured according to a CEC F-23-01 (XUD-9) test; and/or wherein the formed quaternary ammonium salt has the structure

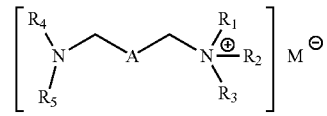

Wherein A includes 2 to 6 carbon units with one carbon unit thereof independently replaced with —O— or —NH—; and/or wherein $R_1$, $R_2$, and R3 are independently alkyl groups containing 1 to 8 carbon atoms; and/or wherein $R_4$ and $R_5$ are independently a hydrogen, an acyl group, or a hydrocarbyl substituted acyl group; and/or wherein if one of $R_4$ or $R_5$ is hydrogen, then the other of $R_4$ and $R_5$ is the acyl group or the hydrocarbyl substituted acyl group, and if both $R_4$ and $R_5$ include carbonyl moieties, then one of $R_4$ and $R_5$ includes the acyl group and the other of $R_4$ and $R_5$ includes the hydrocarbyl substituted acyl group, and $R_4$ and $R_5$ together with the N atom to which they are attached, combine to form a ring moiety; and/or wherein $M^-$ is a carboxylate; and/or wherein the carboxylate is oxalate, salicylate, or combinations thereof; and/or wherein the hydrocarbyl substituent has a number average molecular weight of about 200 to about 2500 as measured by GPC using polystyrene as a calibration reference; and/or wherein A is —$(CH_2)_r$—[X—$(CH_2)_{r'}]_p$— with each of r, r', and p independently being 1, 2, 3, or 4 and X being oxygen or NR" with R" being hydrogen or a hydrocarbyl group; and/or wherein X is oxygen.

DETAILED DESCRIPTION

The present disclosure provides fuel additives including a quaternary ammonium salt formed by reacting an alkyl carboxylate with an amide or imide compound formed by reacting a hydrocarbyl substituted acylating agent with a select amine. Also provided herein are fuel compositions including the novel fuel additives and methods of combusting a fuel including the fuel additives herein. The unique quaternary ammonium salts herein are beneficial because they can be made through a simple alkylation process and provide improved detergency at low treat rates by making available a relatively less sterically hindered quaternary nitrogen for detergent activity in the fuel.

In one aspect of this disclosure, an exemplary fuel additive including a quaternary ammonium salt may be formed through a reaction between an alkyl carboxylate and an amide or imide compound obtained by reacting a hydrocarbyl substituted acylating agent and an amine. In one approach of this aspect, the amine has the structure of Formula I

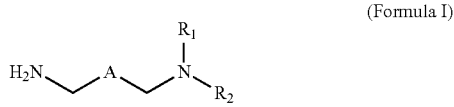

(Formula I)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, and —C(O)NR'. $R_1$ and $R_2$ are independently alkyl groups containing 1 to 8 carbon atoms, and R' is independently a hydrogen or a group selected from $C_{1-6}$ aliphatic, phenyl, or alkylphenyl. In another approach of this aspect, the formed quaternary ammonium salt may be that of Formula II discussed below.

In another aspect of this disclosure, a fuel composition is provided including a major amount of a fuel and a minor amount of a quaternary ammonium salt formed by the reaction of an alkyl carboxylate with an amide or imide compound obtained by reacting a hydrocarbyl substituted acylating agent and an amine, which may be the amine of Formula I above. In one approach of this aspect, the formed quaternary ammonium salt has the structure of Formula II

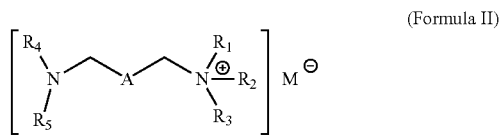

(Formula II)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, and —C(O)NR'. $R_1$, $R_2$, and $R_3$ are independently alkyl groups containing 1 to 8 carbon atoms; and R' is independently a hydrogen or a group selected from $C_{1-6}$ aliphatic, phenyl, or alkylphenyl. $R_4$ and $R_5$ are independently a hydrogen, an acyl group, or a hydrocarbyl substituted acyl group. If one of $R_4$ or $R_5$ is hydrogen, then the other of $R_4$ and $R_5$ is the acyl group or the hydrocarbyl substituted acyl group. If both $R_4$ and $R_5$ include carbonyl moieties, then one of $R_4$ and $R_5$ includes the acyl group and the other of $R_4$ and $R_5$ includes the hydrocarbyl substituted acyl group, and $R_4$ and $R_5$ together with the N atom to which they are attached, combine to form a ring moiety. In other approaches, $R_4$ and $R_5$ together with the N atom to which they are attached, combine to form a hydrocarbyl substituted succinimide. $M^-$ is a carboxylate.

In yet another aspect of this disclosure, a method of operating a fuel injected engine to provide improved engine performance is described. The method includes combusting in the engine a fuel composition including a major amount of fuel and about 1 to about 100 ppm of a quaternary ammonium salt formed by the reaction of an alkyl carboxylate with an amide or imide compound obtained by reacting a hydrocarbyl substituted acylating agent and an amine, wherein the amine has the structure of Formula I or the resulting quaternary ammonium salt has the structure of Formula II. In yet further aspects, a use of the quaternary ammonium salts as described in the previous paragraphs is provided to provide improved engine performance such as a reduced average flow loss of about 45% or less as evaluated by XUD-9, a power recovery of about 65 percent or greater as measured by a CEC F-98-08 test modified to evaluate the ability of an additive to restore power lost due to deposit formation, and/or removal of carboxylate deposits and unsticking injectors on a cold start.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

Amine Compound

In one embodiment, the fuel additives herein are obtained from a select amine having the structure of Formula I

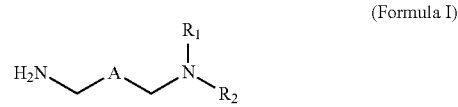

(Formula I)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, and —C(O)NR'. $R_1$ and $R_2$ are independently alkyl groups containing 1 to 8 carbon atoms, and R' is independently a hydrogen or a group selected from $C_{1-6}$ aliphatic, phenyl, or alkylphenyl. In one approach, the select amines of Formula 1 are at least diamines or triamines having a terminal primary amino group on one end for reaction with the hydrocarbyl substituted acylating agent and a terminal tertiary amine on the other end for reaction with the quaternizing agent. In other approaches, A includes 2 to 6 carbon units with one carbon unit thereof replaced with a —O— or a —NH— group. Suitable exemplary tertiary amine for forming the fuel additives herein may be selected from 3-(2-(dimethylamino)ethoxy)propylamine, N,N-dimethyl dipropylene triamine, and mixtures thereof. In other embodiments or approaches, A has the structure —(CH$_2$)$_r$—[X—(CH$_2$)$_{r'}$]$_p$— with each of r, r', and p independently being an integer 1, 2, 3, or 4 and X being either oxygen or NR" with R" being hydrogen or a hydrocarbyl group. In other embodiments, X is oxygen. In yet other embodiments, X is —NH—.

The hydrocarbyl linker A preferably has 1 to 4 carbon units replaced with the bivalent moiety described above, which is preferably a —O— or a —NH— group. In other approaches, 1 to 2 carbon units of the hydrocarbyl linker A and, in yet further approaches, 1 carbon unit of the hydrocarbyl linker A is replaced with the bivalent moiety described herein. As appreciated, the remainder of the hydrocarbyl linker A is preferably a carbon atom(s). The number of carbon atoms on either side of the replaced bivalent moiety need not be equal meaning the hydrocarbyl chain between the terminal primary amino group and the terminal tertiary amino group need not be symmetrical relative to the replaced bivalent moiety.

Hydrocarbyl Substituted Acylating Agent

Any of the foregoing described tertiary amines may be reacted with a hydrocarbyl substituted acylating agent that may be selected from a hydrocarbyl substituted mono- di- or polycarboxylic acid or a reactive equivalent thereof to form an amide or imide compound. A particularly suitable acylating agent is a hydrocarbyl substituted succinic acid, ester, anhydride, mono-acid/mono-ester, or diacid. In some approaches, the hydrocarbyl substituted acylating agent is a hydrocarbyl substituted dicarboxylic acid or anhydride derivative thereof, a fatty acid, or mixtures thereof.

In other approaches, the hydrocarbyl substituted acylating agent may be carboxylic acid or anhydride reactant. In one approach, the hydrocarbyl substituted acylating agent may be selected from stearic acid, oleic acid, linoleic acid, linolenic acid, palmitic acid, palmitoleic acid, lauric acid, myristic acid, myristoleic acid, capric acid, caprylic acid, arachidic acid, behenic acid, erucic acid, anhydride derivatives thereof, or a combination thereof.

In one approach, the hydrocarbyl substituted acylating agent is a hydrocarbyl substituted dicarboxylic anhydride of Formula III

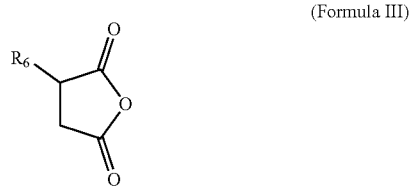

(Formula III)

wherein R$_6$ is a hydrocarbyl or alkenyl group. In some aspects, R$_6$ is a hydrocarbyl group having a number average molecular weight from about 200 to about 2500. For example, the number average molecular weight of R$_6$ may range from about 600 to about 1300, as measured by GPC using polystyrene as a calibration reference. A particularly useful R$_6$ has a number average molecular weight of about 1000 Daltons and comprises polyisobutylene.

The number average molecular weight (Mn) for any embodiment herein may be determined with a gel permeation chromatography (GPC) instrument obtained from Waters or the like instrument and the data was processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5 g, and pore size ranging from 100-10000 Å) with the column temperature at about 40° C. Unstabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1-0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

In some approaches, the R$_6$ hydrocarbyl moiety may comprise one or more polymer units chosen from linear or branched alkenyl units. In some aspects, the alkenyl units may have from about 2 to about 10 carbon atoms. For example, the polyalkenyl radical may comprise one or more linear or branched polymer units formed from ethylene radicals, propylene radicals, butylene radicals, pentene radicals, hexene radicals, octene radicals and decene radicals. In some aspects, the R$_6$ polyalkenyl radical may be in the form of, for example, a homopolymer, copolymer or terpolymer. In other aspects, the polyalkenyl radical is polyisobutylene. For example, the polyalkenyl radical may be a homopolymer of polyisobutylene comprising from about 5 to about 60 isobutylene groups, such as from about 15 to about 30 isobutylene groups. The polyalkenyl compounds used to form the R$_6$ polyalkenyl radicals may be formed by any suitable methods, such as by conventional catalytic oligomerization of alkenes.

In some aspects, high reactivity polyisobutylenes having relatively high proportions of polymer molecules with a terminal vinylidene group may be used to form the R$_6$ group. In one example, at least about 60%, such as about 70% to about 90%, of the polyisobutenes comprise terminal olefinic double bonds. In some aspects, approximately one mole of maleic anhydride may be reacted per mole of polyalkylene, such that the resulting polyalkenyl succinic anhydride has about 0.8 to about 1.5 succinic anhydride group per polyalkylene substituent. In other aspects, the molar ratio of succinic anhydride groups to polyalkylene groups may range from about 0.5 to about 3.5, such as from about 1 to about 1.3.

Quaternizing Agent

A suitable alkylating or quaternizing agent is a hydrocarbyl-substituted carboxylate, such as an alkyl carboxylate. In some approaches or embodiments, the quaternizing agent is an alkyl carboxylate selected form alkyl oxalate, alkyl salicylate, and combinations thereof. In other approaches or embodiments, the alkyl group of the alkyl carboxylate includes 1 to 6 carbon atoms, and is preferably methyl groups.

For alkylation with an alkyl carboxylate, it may be desirable in some approaches that the corresponding acid of the carboxylate have a pKa of less than 4.2. For example, the corresponding acid of the carboxylate may have a pKa of less than 3.8, such as less than 3.5, with a pKa of less than 3.1 being particularly desirable. Examples of suitable carboxylates may include, but not limited to, maleate, citrate, fumarate, phthalate, 1,2,4-benzenetricarboxylate, 1,2,4,5-benzenetetracarboxylate, nitrobenzoate, nicotinate, oxalate, aminoacetate, and salicylate. As noted above, preferred carboxylates include oxalate, salicylate, and combinations thereof.

Quaternary Ammonium Salt

In other approaches or embodiments, the quaternary ammonium salt formed by the reaction of an alkyl carboxylate with an amide or imide compound obtained by reacting a hydrocarbyl substituted acylating agent and an amine of Formula 1 results in a quaternary ammonium salt having the structure of Formula IV

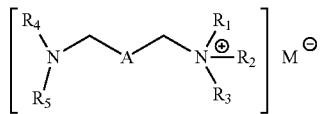

(Formula IV)

Wherein A is a hydrocarbyl linker with 2 to 10 carbon units and including one or more carbon units thereof independently replaced with a bivalent moiety selected from the group consisting of —O—, —N(R')—, —C(O)—, —C(O)O—, or —C(O)NR'. $R_1$, $R_2$, and $R_3$ are independently alkyl groups containing 1 to 8 carbon atoms; and R' is independently a hydrogen or a group selected from $C_{1-6}$ aliphatic, phenyl, or alkylphenyl. $R_4$ and $R_5$ are independently a hydrogen, an acyl group (RC(O)—), or a hydrocarbyl substituted acyl group (the hydrocarbyl substituted acyl group may be derived from a dicarboxylic acid as shown in the exemplary formulas below). In some approaches or embodiments, if one of $R_4$ or $R_5$ is hydrogen, then the other of $R_4$ and $R_5$ is the acyl group or the hydrocarbyl substituted acyl group. In other approaches or embodiments, if both $R_4$ and $R_5$ include carbonyl moieties, then one of $R_4$ and $R_5$ includes the acyl group and the other of $R_4$ and $R_5$ includes the hydrocarbyl substituted acyl group, and $R_4$ and $R_5$ together with the N atom to which they are attached, combine to form a ring moiety. The hydrocarbyl substituted acyl group may include a terminal carboxyl group. $M^-$ is a carboxylate, such as oxalate, salicylate, or combinations thereof.

Suitable examples of the resulting quaternary ammonium salt from the above described reactions include, but are not limited to compounds of the following exemplary structures:

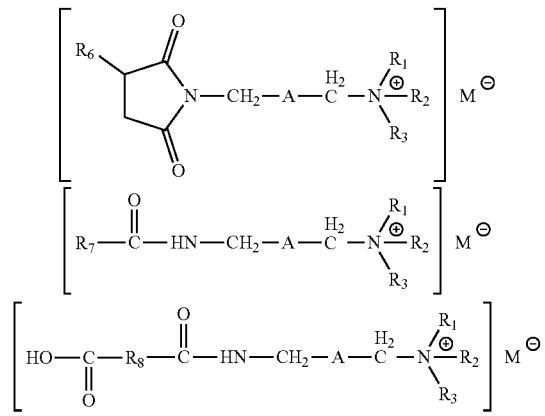

Wherein A, $R_1$, $R_2$, $R_3$, $R_6$, and M are as described above. $R_7$ is a C1 to C30 hydrocarbyl group, and $R_8$ is a C1 to C10 hydrocarbyl linker. Due to the length of the hydrocarbyl chain A and the presence of the replacing bivalent moiety therein as discussed above, it is believed the quaternary ammonium salts as described herein include a relatively sterically available quaternary nitrogen that is more available for detergent activity than prior quaternary ammonium compounds.

When formulating the fuel compositions of this application, the above described additives (reaction products and/or resultant additives as described above) may be employed in amounts sufficient to reduce or inhibit deposit formation in a fuel system, a combustion chamber of an engine and/or crankcase, and/or within fuel injectors. In some aspects, the fuels may contain minor amounts of the above described reaction product or resulting salt thereof that controls or reduces the formation of engine deposits, for example injector deposits in engines. For example, any embodiments of the fuels of this disclosure may contain, on an active ingredient basis, an amount of the quaternary ammonium salt (or reaction product as described herein) in the range of about 1 ppm to about 100 ppm, in other approaches, about 5 ppm to about 50 ppm, in yet further approaches about 10 ppm to about 25 ppm of the quaternary ammonium salt. It will also be appreciated that any endpoint between the above described ranges are also suitable range amounts as needed for a particular application. The active ingredient basis excludes the weight of (i) unreacted components associated with and remaining in the product as produced and used, and (ii) solvent(s), if any, used in the manufacture of the product either during or after its formation.

Other Additives

One or more optional compounds may be present in the fuel compositions of the disclosed embodiments. For example, the fuels may contain conventional quantities of cetane improvers, octane improvers, corrosion inhibitors, cold flow improvers (CFPP additive), pour point depressants, solvents, demulsifiers, lubricity additives, friction modifiers, amine stabilizers, combustion improvers, detergents, dispersants, antioxidants, heat stabilizers, conductivity improvers, metal deactivators, marker dyes, organic nitrate ignition accelerators, cyclomatic manganese tricarbonyl compounds, carrier fluids, and the like. In some aspects, the compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, 2-ethylhexanol, and the like.

In some aspects of the disclosed embodiments, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cyclomatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cyclomatic manganese tricarbonyl compounds are disclosed in U.S. Pat. Nos. 5,575,823 and 3,015,668 both of which disclosures are herein incorporated by reference in their entirety.

Other commercially available detergents may be used in combination with the reaction products described herein. Such detergents include but are not limited to succinimides, Mannich base detergents, quaternary ammonium detergents, bis-aminotriazole detergents as generally described in U.S. patent application Ser. No. 13/450,638, and a reaction product of a hydrocarbyl substituted dicarboxylic acid, or anhydride and an aminoguanidine, wherein the reaction product has less than one equivalent of amino triazole group per molecule as generally described in U.S. patent application Ser. Nos. 13/240,233 and 13/454,697.

The additives of the present application, including the quaternary ammonium salts described above, and optional additives used in formulating the fuels of this invention may be blended into the base fuel individually or in various sub-combinations. In some embodiments, the additive components of the present application may be blended into the fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

Fuels

The fuels of the present application may be applicable to the operation of diesel, jet, or gasoline engines. In one approach, the quaternary ammonium salts herein are well suited for diesel or gasoline as shown in the Examples. In one embodiment, the fuel is diesel fuel. In another embodiment, the fuel is gasoline. In yet another embodiment, the fuel is a jet fuel. The fuels may include any and all middle distillate fuels, diesel fuels, biorenewable fuels, biodiesel fuel, fatty acid alkyl ester, gas-to-liquid (GTL) fuels, gasoline, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. "Biorenewable fuels" as used herein is understood to mean any fuel which is derived from resources other than petroleum. Such resources include, but are not limited to, corn, maize, soybeans and other crops; grasses, such as switchgrass, *miscanthus*, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol. Preferred fuels include diesel fuels.

The fuels herein are suitable for use in various internal combustion systems or engines. The systems or engines may include both stationary engines (e.g., engines used in electrical power generation installations, in pumping stations, etc.) and ambulatory engines (e.g., engines used as prime movers in automobiles, trucks, road-grading equipment, military vehicles, etc.). By combustion system or engine herein is meant, internal combustion engines, for example and not by limitation. Atkinson cycle engines, rotary engines, spray guided, wall guided, and the combined wall/spray guided direct injection gasoline ("DIG" or "GDI") engines, turbocharged DIG engines, supercharged DIG engines, homogeneous combustion DIG engines, homogeneous/stratified DIG engines, DIG engines outfitted with piezoinjectors with capability of multiple fuel pulses per injection, DIG engines with EGR, DIG engines with a lean-NOx trap, DIG engines with a lean-NOx catalyst, DIG engines with SN—CR NOx control, DIG engines with exhaust diesel fuel after-injection (post combustion) for NOx control, DIG engines outfitted for flex fuel operation (for example, gasoline, ethanol, methanol, biofuels, synthetic fuels, natural gas, liquefied petroleum gas (LPG), and mixtures thereof.) Also included are conventional and advanced port-fueled internal combustion engines, with and without advanced exhaust after-treatment systems capability, with and without turbochargers, with and without superchargers, with and without combined supercharger/turbocharger, with and without on-board capability to deliver additive for combustion and emissions improvements, and with and without variable valve timing. Further included are gasoline fueled homogeneous charge compression ignition (HCCI) engines, diesel HCCI engines, two-stroke engines, diesel fuel engines, gasoline fuel engines, stationary generators, gasoline and diesel HCCI, supercharged, turbocharged, gasoline and diesel direct injection engines, engines capably of variable valve timing, leanburn engines, engines capable of inactivating cylinders or any other internal combustion engine. Still further examples of combustion systems include any of the above-listed systems combined in a hybrid vehicle with an electric motor.

Accordingly, aspects of the present application are directed to methods of or the use of the quaternary ammonium compounds herein for reducing injector deposits in an internal combustion system or engine or within a fuel system for an internal combustion system or engine, cleaning-up fouled injectors, or un-sticking injectors. In another aspect, the quaternary ammonium compounds described herein or fuel containing the quaternary ammonium compounds herein may be combined with one or more of polyhydrocarbyl-succinimides, -acids, -amides, -esters, -amide/acids and -acid/esters, reaction products of polyhydrocarbyl succinic anhydride and aminoguanidine and its salts, Mannich compounds, and mixtures thereof. In other aspects, the methods or use include injecting a hydrocarbon-based fuel comprising a quaternary ammonium compounds of the present disclosure through the injectors of the engine into the combustion chamber, and igniting the fuel to prevent or remove deposits on fuel injectors, to clean-up fouled injectors, and/or to unstick injectors. In some aspects, the method may also comprise mixing into the fuel at least one of the optional additional ingredients described above.

EXAMPLES

The following examples are illustrative of exemplary embodiments of the disclosure. In these examples as well as elsewhere in this application, all ratios, parts, and percentages are by weight unless otherwise indicated. It is intended that these examples are being presented for the purpose of illustration only and are not intended to limit the scope of the invention disclosed herein.

Comparative Example 1

A comparative quaternary ammonium salt was prepared in a manner consistent to various examples (e.g., Example 2, Example 10, etc.) in EP 2 531 580 B1. Comparative preparative additive A (a comparative preparatory polyisobutenyl succinimide, PIBSI) was prepared as follows: 207.95 grams (0.218 equivalents of anhydride) of polyisobutenyl succinic anhydride (PIBSA, made with about 1000 average MW polyisobutylene, PIB, and maleic anhydride) and 92.60 grams of toluene were charged in a 1 liter reaction flask equipped with Dean-Stark trap. Under nitrogen, the mixture was stirred and heated to 90° C. Over about 10 minutes, 22.30 grams of dimethylamino propylamine (DMAPA) was added. The temperature was increased to about 165° C. and held for 4 hours while removing water. Toluene was removed under vacuum. IR spectroscopy of the product confirmed formation of the succinimide.

Comparative additive B (a comparative quaternary ammonium salt) was prepared as follows: 100.53 grams (0.0970 moles) of Additive A and 14.76 grams (0.0970 moles) of methyl salicylate were charged in a 250 ml reaction flask. The mixture was heated under nitrogen to 140° C. and held for 7 hours. $^1$H NMR spectroscopy of the product confirmed formation of a quaternary ammonium salt.

Example 1

Additive C (preparatory oleyl amide) was prepared as follows: 249.05 grams (0.882 moles) of oleic acid and 60.35 grams of toluene where charged in a 1 liter reaction flask equipped with Dean-Stark trap. Under nitrogen, the mixture was stirred and heated to 100° C. Over about 20 minutes, 128.77 grams (0.882 moles) of 3-(2-(dimethylamino) ethoxy) propylamine (DMAEPA) was added. The temperature was increased to about 165° C. and held for 4 hours while removing water. Toluene was removed under vacuum. IR spectroscopy of the product confirmed formation of the amide.

Additive D (an inventive quaternary ammonium salt) was prepared as follows: 7.50 grams (0.0183 moles) of Additive C and 2.80 grams (0.0184 moles) of methyl salicylate were charged in a thick walled glass tube and sealed. The mixture was heated under nitrogen to 140° C. and held for 12 hours. $^1$H NMR spectroscopy of the product confirmed formation of the quaternary ammonium salt.

Example 2

Additive E (preparatory ASA succinimide) was prepared as follows: 270.93 grams (0.679 equivalents of anhydride) of a $C_{20-24}$ alkenyl succinic anhydride (ASA) and 105.73 grams of toluene were charged in a 1 liter reaction flask equipped with Dean-Stark trap. Under nitrogen, the mixture was stirred and heated to 100° C. Over about 15 minutes, 99.13 grams (0.679 moles) of 3-(2-(dimethylamino)ethoxy) propylamine (DMAEPA) was added. The temperature was increased to about 160° C. and held for 4 hours while removing water. Toluene was removed under vacuum. IR spectroscopy of the product confirmed formation of the amide.

Additive F (inventive quaternary ammonium salt) was prepared as follows: 106.71 grams (0.202 moles) of Additive E and 30.78 grams (0.202 moles) of methyl salicylate were charged in a 250 ml reaction flask. The mixture was heated under nitrogen to 140° C. and held for 6 hours. $^1$H NMR spectroscopy of the product confirmed formation of the quaternary ammonium salt.

Example 3

Additive G (preparatory PIBSI) was prepared as follows: 207.75 grams (0.218 equivalents of anhydride) of PIBSA (made with about 1000 MW PIB and maleic anhydride) and 67.96 grams of toluene were charged in a 1 liter reaction flask equipped with Dean-Stark trap. Under nitrogen, the mixture was stirred and heated to 100° C. Over about 15 minutes, 30.24 grams (0.207 moles) of 3-(2-(dimethylamino)ethoxy)propylamine (DMAEPA) was added. The temperature was increased to about 160° C. and held for 3 hours while removing water. Toluene was removed under vacuum. IR spectroscopy of the product confirmed formation of the succinimide.

Additive H (inventive quaternary ammonium salt) was prepared as follows: 67.20 grams (0.057 moles) of Additive G and 8.69 grams (0.057 moles) of methyl salicylate were charged in a 250 ml reaction flask. The mixture was heated under nitrogen to 140° C. and held for 6 hours. $^1$H NMR spectroscopy of the product confirmed formation of the quaternary ammonium salt.

Example 4

Additive I (preparatory PIBSI) was prepared as follows: 287.50 grams (0.126 equivalents of anhydride) of PIBSA (made with 2300 MW PIB and maleic anhydride) and 96.15 grams of toluene were charged in a 1 liter reaction flask equipped with Dean-Stark trap. Under nitrogen, the mixture was stirred and heated to 100° C. Over about 5 minutes, 18.20 grams (0.125 moles) of 3-(2-(dimethylamino)ethoxy) propylamine (DMAEPA) was added. The temperature was increased to about 160° C. and held for 4 hours while removing water. Toluene was removed under vacuum. IR spectroscopy of the product confirmed formation of the succinimide.

Additive J (inventive quaternary ammonium salt) was prepared as follows: 95.37 grams (0.0396 moles) of Additive I and 6.02 grams (0.0396 moles) of methyl salicylate were charged in a 250 ml reaction flask. The mixture was heated under nitrogen to 140° C. and held for 6 hours. $^1$H NMR spectroscopy of the product confirmed formation of the quaternary ammonium salt.

Example 5

Additive K (preparatory PIBSI) was prepared as follows: 283.62 grams (0.298 equivalents of anhydride) of PIBSA (made with about 1000 MW PIB and maleic anhydride) and 82.31 grams of toluene were charged in a 1 liter reaction flask equipped with Dean-Stark trap. Under nitrogen, the mixture was stirred and heated to 100° C. Over about 15 minutes, 47.37 grams (0.298 moles) of N,N dimethyldipropylene triamine (DMAPAPA) was added. The temperature was increased to about 160° C. and held for 2 hours while removing water. Toluene was removed under vacuum. IR spectroscopy of the product confirmed formation of the succinimide.

Additive L (inventive quaternary ammonium salt) was prepared as follows: 78.31 grams (0.0717 moles) of Additive K and 10.90 grams (0.0717 moles) of methyl salicylate were charged into a 250 ml reaction flask. The mixture was heated under nitrogen to 160° C. and held for 6 hours. $^1$H NMR spectroscopy of the product confirmed formation of the quaternary ammonium salt.

Example 6

The above quaternary ammonium salt additives from the comparative and inventive Examples were evaluated in a diesel fuel using an XUD-9 test (CEC F-23-A-01). The XUD-9 test method evaluates the capability of a fuel to control the formation of deposits on the injector nozzles of an indirect injection diesel engine. Results of tests run according to the XUD-9 test method were expressed in terms of the percentage airflow loss at various injector needle lift points. Airflow measurements were accomplished with an airflow rig complying with ISO 4010.

Prior to conducting the test, the injector nozzles were cleaned and checked for airflow at 0.05, 0.1, 0.2, 0.3 and 0.4 mm lift. Nozzles were discarded if the airflow was outside of the range 250 ml/min to 320 ml/min at 0.1 mm lift. The nozzles were assembled into the injector bodies and the opening pressures set to 115±5 bar. A slave set of injectors was also fitted to the engine. The previous test fuel was drained form the system. The engine was run for 25 minutes in order to flush through the fuel system. During this time all the spill-off fuel was discarded and not returned. The engine was then set to test speed and load and all specified parameters checked and adjusted to the test specification. The slave injectors were then replaced with the test units. Air flow was measured before and after the test. An average of 4 injector flows at 0.1 mm lift was used to calculate the percent of fouling. The degree of flow remaining=100–percent of fouling. The results are provided in Table 1 below.

TABLE 1

XUD-9 Test Results

| Additive | Active Treat Rate (ppm by wt) | Average Flow Loss (%) |
| --- | --- | --- |
| None | — | 70 |
| B (Comparative) | 15 | 45 |
| D | 10 | 9 |
| F | 10 | 36 |
| H | 10 | 10 |
| H | 15 | 5 |
| H | 30 | 0 |
| J | 15 | 43 |
| L | 15 | 45 |

All of the inventive additives performed as well as or better (had the same or lower flow loss) than the comparative additive. Moreover, certain inventive additives demonstrated dramatically improved detergency at a lower treat rate that the comparative additives.

Example 7

A DW-10B diesel engine was also run to determine the inventive additives ability to clean up fouled injectors using a test outlined in CEC F-98-08. Using the test cycle and dopant (1 ppm Zn as zinc neodecanoate) used in CEC F-98-08, inventive additives H and D were evaluated for their ability in diesel fuel to remove (clean up) deposits. To perform this evaluation, the engine was first run with zinc dopant in the fuel, resulting in a power loss due to fouling of the injector holes. Then, the engine was run on fuel containing both the zinc dopant and detergent additive(s). A more detailed description of this protocol can be found in U.S. Pat. No. 8,894,726 B2 (Column 9), which is incorporated herein by reference and further discussed below. The results are shown in Table 3.

Diesel Engine Test Protocol:

The DW-10 test was developed by Coordinating European Council (CEC) to demonstrate the propensity of fuels to provoke fuel injector fouling and can also be used to demonstrate the ability of certain fuel additives to prevent or control these deposits. Additive evaluations used the protocol of CEC F-98-08 for direct injection, common rail diesel engine nozzle coking tests. An engine dynamometer test stand was used for the installation of the Peugeot DW10 diesel engine for running the injector coking tests. The engine was a 2.0 liter engine having four cylinders. Each combustion chamber had four valves and the fuel injectors were DI piezo injectors that have a Euro V classification.

The core protocol procedure consisted of running the engine through a cycle for 8-hours and allowing the engine to soak (engine off) for a prescribed amount of time. The foregoing sequence was repeated four times. At the end of each hour, a power measurement was taken of the engine while the engine was operating at rated conditions. The injector fouling propensity of the fuel was characterized by a difference in observed rated power between the beginning and the end of the test cycle.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4,000 RPM and full load to check for full power restoration after cleaning the injectors. If the power measurements were within specification, the test cycle was initiated. Table 2 below provides a representation of the DW-10 coking cycle that was used to evaluate the fuel additives according to the disclosure.

TABLE 2

One hour representation of DW-10 coking cycle

| Step | Duration (minutes) | Engine speed (rpm) | Load (%) | Torque (Nm) | Boost air after Intercooler (° C.) |
| --- | --- | --- | --- | --- | --- |
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3500 | 80 | 212 | 50 |
| 5 | 2 | 1750 | 20 | 62 | 45 |
| 6 | 10 | 4000 | 100 | * | 50 |
| 7 | 2 | 1250 | 10 | 25 | 43 |
| 8 | 7 | 3000 | 100 | * | 50 |
| 9 | 2 | 1250 | 10 | 25 | 43 |
| 10 | 10 | 2000 | 100 | * | 50 |
| 11 | 2 | 1250 | 10 | 25 | 43 |
| 12 | 7 | 4000 | 100 | * | 50 |

Fuel additives D and H from Examples 1 and 3 were tested using the foregoing engine test procedure in an ultra-low sulfur diesel fuel containing zinc neodecanoate, 2-ethylhexyl nitrate, and a fatty acid ester friction modifier (base fuel). A "dirty-up" phase consisting of base fuel only with no additive was initiated, followed by a "clean-up" phase consisting of base fuel plus additive as noted in Table 3 below. All runs were made with 8 hour dirty-up and 8 hour clean-up unless indicated otherwise. The percent power recovery was calculated using the power measurement at end of the "dirty-up" phase and the power measurement at end of the "clean-up" phase. The percent power recovery was determined by the following formula: Percent Power recovery=(DU−CU)/DU×100, wherein DU is a percent power loss at the end of a dirty-up phase without the additive, CU is the percent power at the end of a clean-up phase with the fuel additive, and power is measured according to CEC F98-08 DW10 test.

TABLE 3

DW-10B Test Results—Clean Up

| Additive(s) | Active Treat Rate(s) (ppm by wt) | Power Loss after Dirty Up (%) | Power Loss after 8 hours of Clean Up (%) | Power Recovery (%) |
|---|---|---|---|---|
| H | 45 | 4.53 | 0.59 | 87 |
| H and D | 30 and 5 | 5.80 | 2.03 | 65 |

Example 8

Another evaluation involving the DW-10B test was run to determine the additives ability to remove carboxylate deposits in a diesel engine. These types of deposits can form on internal moving parts causing injector sticking on cold start. A description of the test protocol can be found in U.S. Pat. No. 8,529,643 B2 (Columns 11-12), which is incorporated herein by reference and further discussed below, with the exception that the fouling dopants were 0.5 ppm by wt sodium as sodium naphthenate and 10 ppm by wt dodecenyl succinic acid (DDSA).

In this example, the effect of inventive additives on diesel fuel contaminated with carboxylate salts for high pressure common rail diesel fuel systems was evaluated. An engine test was used to demonstrate the propensity of fuels to provoke fuel injector sticking and was also used to demonstrate the ability of certain fuel additives to prevent or control the internal deposits in the injectors. An engine dynamometer test stand was used for the installation of a Peugeot DW10 diesel engine for running the injector sticking tests. The engine was a 2.0 liter engine having four cylinders. Each combustion chamber had four valves and the fuel injectors were DI piezo injectors have a Euro V classification.

The core protocol procedure consisted of running the engine through a cycle for 8-hours and allowing the engine to soak (engine off) for a prescribed amount of time. The injector performance was then characterized by measuring the cylinder exhaust temperature for each cylinder. A test was stopped and considered to have failed (one or more injectors sticking) if the exhaust temperature of any cylinder was more than 65° C. above any other cylinder exhaust temperature at any point in time. A test was also considered to have failed if after allowing the engine to cool to ambient temperature, a cold start showed a temperature difference of 45° C. or more in cylinder exhaust temperatures. Sticking of the needle and thus failure could also be confirmed by disassembling the injector and subjectively determining the force required to remove the needle from the nozzle housing. Cleanliness tests were run for keep-clean performance as well as clean-up performance.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4,000 RPM and full load to check for full power restoration after cleaning the injectors. If the power measurements were within specification, the test cycle was initiated.

The diesel engine nozzle sticking tests were conducted using the Peugeot DW-10 engine following the protocol of Table 2 above. For keep-clean testing, the engine was run with diesel fuel contaminated with metal carboxylate salts and with the detergent additive indicated in Table 5 below. For clean-up testing, the engine was first run with diesel fuel contaminated with metal carboxylate salts without a detergent additive to establish a baseline of stuck fuel injectors. Next, the engine was run with the same fuel containing the detergent additive indicated. In all of the tests, the fuels tested contained 200 ppmv lubricity modifier and 1600 ppmv cetane improver, 0.5 ppmw sodium as sodium naphthenate and 10 ppmw dodecenyl succinic acid (DDSA), 3 ppmw of NaOH, and 25 ppmwv of water. At the beginning of the test, no injector sticking was indicated by a uniform exhaust gas temperature for all 4-cylinders as shown in Table 5 below. However, a cold start of the engine after 8 hours showed injector sticking as also shown in Table 5 due to the increased temperature differential between the cylinders. As also shown in Table 5, Detergent Additive H greatly reduced the maximum exhaust gas temperature difference, indicating that the injectors were no longer sticking.

TABLE 5

DW-10B Test Results—Carboxylate Deposit Removal

| Engine Run Time (hrs) | Dopants | Detergent Additive | Active Detergent Additive Treat Rate (ppm by wt) | Maximum Exhaust Gas Temperature Difference on Cold Start (° C.) |
|---|---|---|---|---|
| Start of Test | None | None | — | 11 |
| 16 | Na/DDSA | None | — | 78 |
| 24 | Na/DDSA | H | 45 | 25 |
| 32 | Na/DDSA | H | 45 | 22 |

Example 9

Inventive additive H from Example 3 above was further tested for its ability to clean-up fouled injectors in a gasoline direct injection (GDI) engine using the procedure set forth in Shanahan, C., Smith, S., and Sears, B., "A General Method for Fouling Injectors in Gasoline Direct Injection Vehicles and the Effects of Deposits on Vehicle Performance," SAE Int. J. Fuels Lubr. 10(3):2017, doi:10.4271/2017-01-2298, which is incorporated herein by reference and discussed further below.

The GDI testing involved the use of a fuel blend to accelerate the dirty-up phase or injector fouling of the GDI engine. The accelerated fuel blend included 409 ppmw of di-tert-butyl disulfide (DTBDS, contributing about 147 ppmw active sulfur to the fuel) and 286 ppmw of tert-butyl hydrogen peroxide (TBHP). The test involved running a 2013 Kia Optima having a 2.4 L, 16 valve, inline 4 gasoline direct injection engine on a mileage accumulation dynamometer. The engine was run using the Quad 4 drive cycle as set forth in the above noted SAE paper (SAE 2017-01-2298) and as set forth in Table 6 below. Injector cleanliness was measured using Long Term Fuel Trim (LTFT) as reported by the vehicle engine control unit (ECU) and was measured relative to the accumulated mileage. Results of the GDI testing are shown below in Table 7.

TABLE 6

Quad 4 Drive Cycle

| Time (min) | 0 | 0.5 | 11.75 | 11.95 | 28.35 | 28.55 | 39.5 | 40 | 64.5 | 64.75 | 82.75 | 83 | 99.4 | 100 | 105 |
|---|---|---|---|---|---|---|---|---|---|---|---|---|---|---|---|
| Speed (mph) | 0 | 40 | 40 | 55 | 55 | 40 | 40 | 55 | 55 | 25 | 25 | 55 | 55 | 0 | 0 |
| Acceleration (mph/sec) | | 1.3 | | 1.3 | | −1.3 | | 0.5 | | −2 | | 2 | | −1.5 | |
| Steady State Duration (min) | | | 11.25 | | 16.4 | | 10.95 | | 24.5 | | 18 | | 16.4 | | 5 |

TABLE 7

GDI Test Results

| Test# | Segment | Phase | Detergent Additive | Additive Treat Rate, ppmw | Vehicle Miles Accumulated During Segment | Change in LTFT from Start of test with clean injectors (%) | Clean Up (%) |
|---|---|---|---|---|---|---|---|
| 1 | 1 | Dirty Up | None (Base) | — | 4453 | 9.13 | |
| | 2 | Clean Up | Additive H | 30 | 1029 | 0.93 | 90 |
| 2 | 1 | Dirty Up | None (Base) | — | 3641 | 7.93 | |
| | 2 | Clean Up | Additive H | 15 | 1029 | 3.75 | 53 |

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fuel additive comprising a quaternary ammonium salt formed by the reaction of an alkyl carboxylate with a compound obtained by reacting a hydrocarbyl substituted acylating agent and an amine to form a succinimide, wherein the amine has the structure

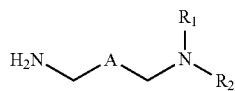

wherein
- A is a hydrocarbyl linker with 2 to 10 carbon units and including one or more carbon units thereof independently replaced with an oxygen atom; and
- $R_1$ and $R_2$ are independently alkyl groups containing 1 to 8 carbon atoms.

2. The fuel additive of claim 1, wherein the alkyl carboxylate is alkyl oxalate, alkyl salicylate, or a combination thereof.

3. The fuel additive of claim 1, wherein the alkyl group in the alkyl carboxylate is C1 to C6 alkyl.

4. The fuel additive of claim 1, wherein A is —$(CH_2)_r$—[X—$(CH_2)_{r'}]_p$— with each of r, r', and p independently being 1, 2, 3, or 4 and X being O.

5. The fuel additive of claim 1, wherein the amine is 3-(2-(dimethyl amino)ethoxy)propylamine.

6. The fuel additive of claim 1, wherein the hydrocarbyl substituted acylating agent is selected from a hydrocarbyl substituted dicarboxylic acid or anhydride derivative thereof, or mixtures thereof.

7. The fuel additive of claim 1, wherein the hydrocarbyl substituent has a number average molecular weight of about 200 to about 2500 as measured by GPC using polystyrene as a calibration reference.

8. A fuel composition comprising a major amount of a fuel and a minor amount of a quaternary ammonium salt formed by the reaction of an alkyl carboxylate with a compound obtained by reacting a hydrocarbyl substituted acylating agent and an amine to form a succinimide, wherein the formed quaternary ammonium salt has the structure

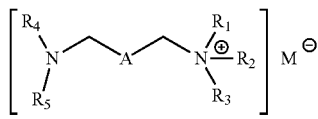

wherein
- A is a hydrocarbyl linker with 2 to 10 carbon units and including one or more carbon units thereof independently replaced with an oxygen atom;
- $R_1$, $R_2$, and $R_3$ are independently alkyl groups containing 1 to 8 carbon atoms;
- $R_4$ and $R_5$ are independently selected from an acyl group or a hydrocarbyl substituted acyl group and $R_4$ and $R_5$ together with the N atom to which they are attached, combine to form a ring moiety; and
- $M^-$ is a carboxylate.

9. The fuel composition of claim 8, comprising about 1 to about 100 ppm of the quaternary ammonium salt.

10. The fuel composition of claim 8, wherein the carboxylate is oxalate, salicylate, or combinations thereof.

11. The fuel composition of claim 8, wherein A is —$(CH_2)_r$—[X—$(CH_2)_{r'}]_p$— with each of r, r', and p independently being 1, 2, 3, or 4 and X being O.

12. The fuel composition of claim 8, wherein the amine is 3-(2-(dimethylamino)ethoxy)propylamine.

13. The fuel composition of claim 8, wherein the hydrocarbyl substituent has a number average molecular weight of about 200 to about 2500 as measured by GPC using polystyrene as a calibration reference.

14. The fuel composition of claim 8, wherein the hydrocarbyl substituent of $R_4$ or $R_5$ has a number average molecular weight of about 200 to about 1300 as measured by GPC using polystyrene as a calibration reference.

15. The fuel composition of claim 8, comprising about 10 to about 30 ppm of the quaternary ammonium salt.

16. A method of operating a fuel injected engine to provide improved engine performance, the method comprising combusting in the engine a fuel composition including a major amount of fuel and about 1 to about 100 ppm of a quaternary ammonium salt formed by the reaction of an alkyl carboxylate with a compound obtained by reacting a hydrocarbyl substituted acylating agent and an amine to form a succinimide, wherein the amine has the structure

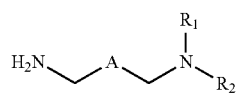

wherein
- A is a hydrocarbyl linker with 2 to 10 carbon units and including one or more carbon units thereof independently replaced with an oxygen atom; and
- $R_1$ and $R_2$ are independently alkyl groups containing 1 to 8 carbon atoms.

17. The method of claim 16, wherein the improved engine performance is an average flow loss of about 45 percent or less when measured according to a CEC F-23-01 (XUD-9) test when the fuel composition includes about 30 ppm or less of the quaternary ammonium salt.

18. A method of claim 16, wherein the formed quaternary ammonium salt has the structure

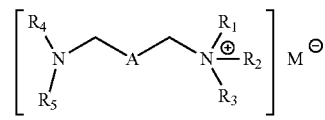

wherein
- A includes 2 to 6 carbon units with one carbon unit thereof independently replaced with an oxygen atom;
- $R_1$, $R_2$, and $R_3$ are independently alkyl groups containing 1 to 8 carbon atoms;
- $R_4$ and $R_5$ are independently selected from an acyl group or a hydrocarbyl substituted acyl group and $R_4$ and $R_5$ together with the N atom to which they are attached, combine to form a ring moiety; and
- $M^-$ is a carboxylate.

19. The method of claim 18, wherein the carboxylate includes oxalate, salicylate, or combinations thereof.

20. The method of claim 18, wherein the hydrocarbyl substituent has a number average molecular weight of about 200 to about 2500 as measured by GPC using polystyrene as a calibration reference.

21. The method of claim 16, wherein the fuel composition includes about 10 to about 30 ppm of the quaternary ammonium salt.

* * * * *